US 8,715,811 B2

(12) United States Patent
Masuda et al.

(10) Patent No.: US 8,715,811 B2
(45) Date of Patent: May 6, 2014

(54) VANADIUM OXIDE THIN FILM PATTERN AND METHOD OF FABRICATING THE SAME

(75) Inventors: Yoshitake Masuda, Aichi (JP); Kunihito Koumoto, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 937 days.

(21) Appl. No.: 12/677,633

(22) PCT Filed: Sep. 10, 2008

(86) PCT No.: PCT/JP2008/066352
§ 371 (c)(1),
(2), (4) Date: Mar. 11, 2010

(87) PCT Pub. No.: WO2009/035007
PCT Pub. Date: Mar. 19, 2009

(65) Prior Publication Data
US 2010/0183854 A1    Jul. 22, 2010

(30) Foreign Application Priority Data

Sep. 12, 2007 (JP) .................................. 2007-236341

(51) Int. Cl.
*B32B 3/00* (2006.01)
*B05D 5/00* (2006.01)

(52) U.S. Cl.
USPC ........ 428/195.1; 428/201; 428/210; 428/702; 428/913; 427/160; 427/265; 427/266; 427/283; 427/443.1

(58) Field of Classification Search
USPC ....................... 428/195.1, 201, 210, 702, 913; 427/160, 265, 266, 283, 443.1
See application file for complete search history.

(56) References Cited

U.S. PATENT DOCUMENTS

| | | | |
|---|---|---|---|
| 2006/0067610 A1* | 3/2006 | Wu et al. ......................... | 385/16 |
| 2008/0295886 A1 | 12/2008 | Hu | |
| 2010/0028254 A1 | 2/2010 | Masuda | |
| 2010/0032197 A1* | 2/2010 | Hong et al. .................... | 174/261 |

FOREIGN PATENT DOCUMENTS

| | | |
|---|---|---|
| JP | 51-111484 | 10/1976 |
| JP | 59-121121 | 7/1984 |

OTHER PUBLICATIONS

Shyue et al. "Acid-Base Properties and Zeta Potentials of Self-Assembled Monolayers Obtained via in Situ Transformations", Langmuir, 2004, vol. 20, pp. 8693-8698.*
English translation of the Written opinion of the International Searching Authority of PCT/JP2008/066352 acquired Mar. 10, 2013.*

(Continued)

*Primary Examiner* — Gerard Higgins
(74) *Attorney, Agent, or Firm* — Suzannah K. Sundby, Esq.; Smith, Gambrell & Russell, LLP

(57) ABSTRACT

The present invention relates to a vanadium oxide thin film pattern which is fabricated by using APTS (3-aminopropyltriethoxysilane, $H_2NC_3H_5Si(OCH_3)_3$) or the like to prepare an APTS-SAM or the like on the surface of a substrate, irradiating this APTS-SAM with vacuum ultraviolet light through a photomask to thereby modify amino-terminal silanes into silanol groups in the exposed area, and then depositing vanadium oxide in a liquid phase using a patterned self-assembled monolayer having the amino-terminated silane surface and silanol group surface as a template for patterning the vanadium oxide, to a method of fabricating the same, and to a vanadium oxide device.

7 Claims, 6 Drawing Sheets

(56) References Cited

OTHER PUBLICATIONS

Zhu, Z.P. et al. "Mechanism of $SO_2$ Promotion for NO Reduction with $NH_3$ over Activated Carbon-Supported Vanadium Oxide Catalyst", Journal of Catalysis 2001, 197(1), 6-16.

Bullot, J. et al. "Semiconducting properties of amorphous $V_2O_5$ layers deposited from gels", Applied Physics Letters 1980, 36(12), 986-988.

Livage, J. et al., "Sol-Gel Synthesis of Oxide Materials", Acta Materialia 1998, 46(3), 743-750.

Kim, B.J.et al., "Temperature dependence of the first-order metal-insulator transition in $VO_2$ and programmable critical temperature sensor", Applied Physics Letters 2007, 90(2).

Schmitt, T. et al., "Electronic structure of Li-inserted $V_6O_{13}$ battery cathodes: Rigid band behavior and effects of hybridization", Applied Physics Letters 2005, 86(6).

Munshi, M.Z.A. et al., "Sodium Insertion Reactions into $V_6O_{13}$ Single Crystals", Chemistry of Materials 1990, 2, (5), 530-534.

Livage, J., "Vanadium Pentoxide Gels", Chemistry of Materials 1991, 3(4), 578-593.

Shigesato, Y. et al., "Thermochromic $VO_2$ Films Deposited by RF Magnetron Sputtering Using $V_2O_3$ or $V_2O_5$ Targets", Japanese Journal of Applied Physics Part 1—Regular Papers Short Notes & Review Papers 2000, 39(10), 6016-6024.

Imada, M. et al., "Metal-insulator transitions", Reviews of Modern Physics 1998, 70(4), 1039-1263.

Babulanam, S.M. et al., "Thermochromic $VO_2$ Films for Energy-Efficient Windows", Solar Energy Materials 1987, 16(5), 347-363.

Jorgenson, G.V. et al., "Doped Vanadium Oxide for Optical Switching Films", Solar Energy Materials 1986, 14(3-5), 205-214.

Manning, T.D. et al., "Atmospheric pressure chemical vapour deposition of tungsten doped vanadium(IV) oxide from $VOCl_3$, water and $WCl_6$", Journal of Materials Chemistry 2004, 14(16), 2554-2559.

Jerominek, H. et al., "Vanadium oxide films for optical switching and detection", Optical Engineering 1993, 32(9), 2092-2099.

Bugayev, A.A. et al., "Femtosecond holographic interferometry for studies of semiconductor ablation using vanadium dioxide film", Optics Letters 2003, 28(16), 1463-1465 Optical Fiber Switching Devices.

Lee, C.E. et al., "Fiber optic application for thermal switching in vanadium dioxide films", Applied Optics 1989, 28(21), 4511-4512.

Cavalleri, A. et al, "Femtosecond Structural Dynamics in $VO_2$ during an Ultrafast Solid-Solid Phase Transition", Physical Review Letters 2001, 87(23).

Xiao, D. et al, "Electrically programmable photonic crystal slab based on the metal-insulator transition in $VO_2$", Journal of Applied Physics 2005, 97(10).

Kato, K. et al., "Study on Thermochromic $VO_2$ Films Grown on ZnO-Coated Glass Substrates for Smart Windows", Japanese Journal of Applied Physics Part 1—Regular Papers Short Notes & Review Papers 2003, 42(10), 6523-6531.

Theil, J.A. et al, "Vanadium reactive magnetron sputtering in mixed $Ar/O_2$ discharges", Thin Solid Films 1997, 298(1-2), 122-129.

Ramana, C.V. et al, "Spectroscopic characterization of electron-beam evaporated $V_2O_5$ thin films", Thin Solid Films 1997, 305(1-2), 219-226.

Ramana, C.V.; Hussain, O.M., "Optical Absorption Behaviour of Vanadium Pentoxide Thin Films", Advanced Materials for Optics and Electrons 1997, 7(5), 225-231.

Manning, T.D. et al, "Intelligent window coatings: atmospheric pressure chemical vapour deposition of vanadium oxides", Journal of Materials Chemistry 2002, 12(10), 2936-2939.

Manning, T.D. et al, "Intelligent Window Coating: Atmospheric Pressure Chemical Vapor Deposition of Tungsten-Doped Vanadium Dioxide", Chemistry of Materials 2004, 16(4), 744-749.

Sahana, M.B. et al, "Metalorganic chemical vapor deposition of highly oriented thin film composites of $V_2O_5$ and $V_6O_{13}$: Suppression of the metal-semiconductor transition in $V_6O_{13}$", Journal of Materials Research 2004, 19(10), 2859-2870.

Barreca, D. et al., "Highly Oriented $V_2O_5$ Nanocrystalline Thin Films by Plasma-Enhanced Chemical Vapor Deposition", Chemistry of Materials 2000, 12(1), 98-103.

Ramana, C.V. et al., "Correlation between Growth Conditions, Microstructure, and Optical Properties in Pulsed-Laser-Deposited $V_2O_5$ Thin Films", Chemistry of Materials 2005, 17(5), 1213-1219.

Ono et al., "Modification and evaluation of vanadium oxide thin film in an aqueous solution", 2005 Nen The Ceramic Society of Japan Nenkai Koen Yokoshu, Mar. 22, 2005, p. 60, lower part.

Ono et al., "Preparation of vanadium oxide thin film on self-assembled monolayer", Dai 18 Kai Fall Meeting of the Ceramic Society of Japan Dai 1 Kai Asia-Oceania Ceramic Renmei Kokusai Kaigi Koen Yokoshu, Sep. 27, 2005, p. 223, upper part.

Wu et al., "Strain-induced self organization of metal-insulator domains in single-crystalline $VO_2$ nanobeams", Nano Letters, 2006, vol. 6, No. 10, pp. 2313-2317.

Shyue et al., "Deposition of vanadium (V) oxide thin films on nitrogen containing self-assembled monolayers", Chemistry of Materials, 2005, vol. 17, No. 4, pp. 787-794.

International Search Report for PCT/JP2008/066352 mailed Oct. 14, 2008.

* cited by examiner

VANADIUM OXIDE THIN FILM PATTERN AND METHOD OF FABRICATING THE SAME

TECHNICAL FIELD

The present invention relates to a vanadium oxide thin film and vanadium oxide thin film pattern, and to a method of fabricating the same, and relates more particularly to a vanadium oxide thin film and vanadium oxide thin film pattern formed on the amino-terminated silane region of a self-assembled monolayer used as a template, to a method of fabricating the same, and to a device product thereof.

The vanadium oxide thin film and vanadium oxide thin film pattern of the present invention is characterized by that has amino groups of an APTS-SAM, or N atoms derived from amino groups, at the boundary with the substrate. The present invention provides a vanadium oxide thin film and vanadium oxide thin film pattern, and a product thereof, that can be used preferably for thermoresponsive heat-shielding glass (smart windows), thermosensors and the like.

BACKGROUND ART

Vanadium oxides (VOx) have been highly paid attention to catalysts (Non-patent Document 1), elements for switching devices (Non-patent Document 2), antistatic coatings (Non-patent Document 3), thermosensors (Non-patent Document 4), cathodes of lithium ion battery (Non-patent Documents 5 and 6), counter-electrodes for electrochromic display devices (Non-patent Document 7) and the like.

In particular, vanadium oxides have the property of dramatically altering their optical and electrical characteristics by means of a semiconductor-metal phase transition from monoclinic crystals at low-temperature to tetragonal crystals at high-temperature during the transition temperature (transition temperature, Tt) (Non-patent Documents 8 and 9).

Since the transition temperature of vanadium oxide ($VO_2$) is near 68° C., which is close to room temperature, it is expected as a promising material for thermoresponsive heat-shielding glass (smart windows) (Non-patent Documents 10 to 12), thermosensors (Non-patent Document 4), non-cooled infrared bolometers (non-cooled infrared detectors) (Non-patent Document 13), holographic storage systems (data recording media using materials with high photosensitive efficiency) (Non-patent Document 14), optical fiber switching devices (Non-patent Document 15), ultra-high-speed switching devices (Non-patent Document 16), photonic crystals (Non-patent Document 17) and the like.

Therefore, synthesis of vanadium oxides and related substances has been reported using various methods, including magnetron sputtering (Non-patent Documents 8, 18 and 19), electron beam deposition (Non-patent Documents 20 and 21), chemical vapor deposition method (Non-patent Documents 22 to 25), the sol-gel method (Non-patent Documents 2, 3, and 7), pulse laser deposition method (Non-patent Document 26) and the like.

Specifically, attention has focused on the potential of vanadium oxides (VOx) for catalysts, elements for switching device, antistatic coatings, thermosensors, lithium ion battery cathodes, electrochromic display device counter-electrodes and the like. In particular, vanadium oxides have the property of dramatically altering their optical and electrical characteristics by means of a semiconductor-metal phase transition from low-temperature monoclinic crystals to high-temperature tetragonal crystals at the transition temperature (transition temperature, Tt).

Since the transition temperature of vanadium oxide ($VO_2$) is near 68° C., which is close to room temperature, it is expected as a promising material for thermoresponsive heat-shielding glass (smart windows), heat sensors, non-cooled infrared bolometers (non-cooled infrared detectors, holographic storage systems (data recording media using materials with high photosensitive efficiency), optical fiber switching devices, ultra-high-speed switching devices, photonic crystals and the like. Therefore, synthesis of vanadium oxides and related substances has been reported using various methods, including magnetron sputtering, electron beam deposition, chemical vapor deposition method, the sol-gel method, pulse laser deposition method and the like.

Recently, the aqueous solution process has gained attention from the standpoint of device construction on low-heat-resistance polymers and transparent conductive films. The aqueous solution process is also highly advantageous because it is an environmentally friendly process that uses little energy, produces little $CO_2$ and does not require an organic binder for sintering purposes. For microfabrication of the thin film, a major consideration in the context of microdevice preparation is required.

However, the desirable properties of vanadium oxide are seriously affected by etching during micropatterning of the thin film. There is therefore a need for thin film micropatterning techniques that do not involve an etching process.

Problems of prior art with regard to vanadium oxides include the impossibility of coating on low-heat-resistance substrates, the difficulty of forming large areas, the difficulty of coating substrates with complex shapes, and the high equipment and manufacturing costs and the like. Microfabrication of the thin film is also a major consideration in the context of microdevice preparation. However, the desirable properties of vanadium oxides are seriously affected by etching during micropatterning of the thin film. Therefore, thin film micropatterning techniques need to be developed that do not involve an etching process. There is also increasing demand for a move towards environmentally friendly process that use less energy, produce less $CO_2$ and do not require organic binders for sintering.

Non-patent Document 1: Zhu, Z. P.; Liu, Z. Y., Niu, H. X.; Liu, S. J.; Hu, T. D.; Liu, T.; Xie, Y. N., Journal of Catalysis 2001, 197(1), 6-16

Non-patent Document 2: Bullot, J.; Gallais, O.; Gauthier, M.; Livage, J., Applied Physics Letters 1980, 36(12), 986-988

Non-patent Document 3: Livage, J.; Beteille, F.; Roux, C.; Chatry, M.; Davidson, P., Acta Materialia 1998, 46(3), 743-750

Non-patent Document 4: Kim, B. J.; Lee, Y. W.; Chae, B. G., Yun, S. J.; Oh, S. Y.; Kim, H. T.; Lim, Y. S., Applied Physics Letters 2007, 90(2)

Non-patent Document 5: Schmitt, T.; Augustsson, A.; Nordgren, J.; Duda, L. C.; Howing, J.; Gustafsson, T.; Schwingenschlogl, U.; Eyert, V., Applied Physics Letters 2005, 86(6)

Non-patent Document 6: Munshi, M. Z. A.; Smyrl, W. H.; Schmidtke, C., Chemistry of Materials 1990, 2, (5), 530-534

Non-patent Document 7: Livage, J., Chemistry of Materials 1991, 3(4), 578-593

Non-patent Document 8: Shigesato, Y.; Enomoto, M.; Odaka, H., Japanese Journal of Applied Physics Part 1—Regular Papers Short Notes & Review Papers 2000, 39(10), 6016-6024

Non-patent Document 9: Imada, M.; Fujimori, A.; Tokura, Y., Reviews of Modern Physics 1998, 70(4), 1039-1263

Non-patent Document 10: Babulanam, S. M.; Eriksson, T. S.; Niklasson, G. A.; Granqvist, C. G., Solar Energy Materials 1987, 16(5), 347-363

Non-patent Document 11: Jorgenson, G. V.; Lee, J. C., Solar Energy Materials 1986, 14(3-5), 205-214

Non-patent Document 12: Manning, T. D.; Parkin, I. P., Journal of Materials Chemistry 2004, 14(16), 2554-2559

Non-patent Document 13: Jerominek, H.; Picard, F.; Vincent, D., Optical Engineering 1993, 32(9), 2092-2099

Non-patent Document 14: Bugayev, A. A., Gupta, M. C., Optics Letters 2003, 28(16), 1463-1465 Optical Fiber Switching Devices Non-patent Document 15: Lee, C. E.; Atkins, R. A., Gibler, W. N.; Taylor, H. F., Applied Optics 1989, 28(21), 4511-4512

Non-patent Document 16: Cavalleri, A.; Toth, C.; Siders, C. W.; Squier, J. A.; Raksi, F.; Forget, P.; Kieffer, J. C., Physical Review Letters 2001, 87(23)

Non-patent Document 17: Xiao, D.; Kim, K. W.; Zavada, J. M., Journal of Applied Physics 2005, 97(10)

Non-patent Document 18: Kato, K.; Song, P. K.; Odaka, H.; Shigesato, Y., Japanese Journal of Applied Physics Part 1—Regular Papers Short Notes & Review Papers 2003, 42(10), 6523-6531

Non-patent Document 19: Theil, J. A.; Kusano, E.; Rockett, A., Thin Solid Films 1997, 298(1-2), 122-129

Non-patent Document 20: Ramana, C. V.; Hussain, O. M.; Naidu, B. S.; Reddy, P. J., Thin Solid Films 1997, 305(1-2), 219-226

Non-patent Document 21: Ramana, C. V.; Hussain, O. M., Advanced Materials for Optics and Electrons 1997, 7(5), 225-231

Non-patent Document 22: Manning, T. D.; Parkin, I. P.; Clark, R. J. H.; Sheel, D.; Pemble, M. E.; Vernadou, D., Journal of Materials Chemistry 2002, 12(10), 2936-2939

Non-patent Document 23: Manning, T. D.; Parkin, I. P.; Pemble, M. E.; Sheel, D.; Vernardou, D., Chemistry of Materials 2004, 16(4), 744-749

Non-patent Document 24: Sahana, M. B.; Shivashankar, S. A., Journal of Materials Research 2004, 19(10), 2859-2870

Non-patent Document 25: Barreca, D.; Armelao, L.; Caccavale, F.; Di Noto, V.; Gregori, A.; Rizzi, G. A.; Tondello, E., Chemistry of Materials 2000, 12(1), 98-103

Non-patent Document 26: Ramana, C. V.; Smith, R. J.; Hussain, O. M.; Chusuei, C. C.; Julien, C. M., Chemistry of Materials 2005, 17(5), 1213-1219

DISCLOSURE OF THE INVENTION

Under these circumstances and in light of the prior technology described above, the inventors in this case perfected the present invention after discovering, as a result of exhaustive research aimed at developing techniques for micropatterning vanadium oxide thin films without an etching process, that a vanadium oxide thin film could be formed or patterned on a substrate using a self-assembled monolayer. It is an object of the present invention to provide a vanadium oxide thin film and vanadium oxide thin film pattern achieved in light of the circumstances described above, along with a method for fabricating the same.

To resolve the aforementioned problems, the present invention comprises the following technical means.

(1) A vanadium oxide thin film characterized by that deposited in a solution reaction system capable of depositing a vanadium-containing solid on a substrate, wherein the vanadium oxide exists on an amino-terminated silane region of the substrate.

(2) The vanadium oxide thin film according to (1) above, wherein the vanadium oxide thin film exists selectively on the amino-terminated silane region of the substrate and has a vanadium oxide thin film pattern.

(3) The vanadium oxide thin film according to (1) or (2) above, wherein the substrate is a glass, silicon, metal, ceramic or polymer substrate.

(4) The vanadium oxide thin film according to (1), (2) or (3) above, wherein the substrate has a flat plate, particulate, fibrous or complex form.

(5) The vanadium oxide thin film according to (2) above, wherein the substrate is a substrate on which has been formed a self-assembled monolayer patterned with amino groups and silanol groups.

(6) A method for fabricating a vanadium oxide thin film on a substrate, comprising 1) preparing a patterned self-assembled monolayer having an amino-terminated silane surface and a silanol group surface on a substrate, and 2) dipping this patterned self-assembled monolayer in a solution reaction system capable of depositing a vanadium-containing solid, to thereby deposit vanadium oxide in a liquid phase.

(7) The method for fabricating a vanadium oxide thin film according to (6) above, wherein the vanadium oxide is deposited in a liquid phase by adjusting the temperature, raw material concentration, additives and/or pH of the reaction system.

(8) The method for fabricating a vanadium oxide thin film according to (6) above, wherein a substrate surface having a positive zeta potential at pH 5 is used in place of the self-assembled monolayer.

(9) The method for fabricating a vanadium oxide thin film according to (6) above, wherein a reaction system of an aqueous solution reaction, non-aqueous solution reaction or hydrothermal reaction is used as a solution reaction system.

(10) A vanadium oxide device containing, as a constituent element, the vanadium oxide thin film or vanadium oxide thin film pattern according to any of (1) to (5) above.

The present invention is explained in more detail below.

The present invention is a vanadium oxide thin film deposited by a solution reaction system that deposits a vanadium-containing solid on a substrate, and is formed on the amino-terminated silane region of a substrate. In preferred embodiments of the present invention, this vanadium oxide thin film is formed selectively on the amino-terminated silane region of the substrate to produce a vanadium oxide thin film pattern, and the substrate has a self-assembled monolayer patterned with amino groups and silanol groups formed thereon.

The present invention is also a method of fabricating a vanadium oxide thin film formed on a substrate, wherein a patterned self-assembled monolayer having an amino-terminated silane surface and a silanol group surface is prepared on a substrate, and this patterned self-assembled monolayer is dipped in a solution reaction system capable of depositing a vanadium-containing solid to thereby deposit vanadium oxide in a liquid phase. In a preferred embodiment of the present invention, the liquid phase of vanadium oxide is deposited by adjusting the temperature, raw material concentration, additives and/or pH of the reaction system.

The present invention is also a vanadium oxide device containing as a constituent element the aforementioned vanadium oxide thin film or vanadium oxide thin film pattern. In the present invention, patterning of a vanadium oxide film on a glass or other substrate is achieved by using a self-assembled monolayer.

In the present invention, a thin film pattern is formed without the use of an etching process. As a consequence, it is possible to avoid property degradation due to etching. Also, all of the raw materials are used to form the thin film. The prepared vanadium oxide thin film has lower transmissibility at higher temperatures (thermochromism) in the visible light range and near-infrared light range.

Because thin film patterning is achieved using an aqueous solution process, moreover, thin films can be formed on PET or polyimide for example, making it possible to confer thermochromism on polymer windows which can then be used as smart windows. By using a polymer substrate, it is possible to make devices cheaper, lighter weight and more flexible (causation of flexibility).

The most important feature of the present invention is that a self-assembled monolayer is used to synthesize a vanadium oxide thin film pattern. An APTS-SAM self-assembled monolayer having a positive zeta potential at pH 5 can be used as the self-assembled monolayer. A substrate surface having a positive zeta potential at pH 5 can also be used in place of the self-assembled monolayer.

In addition to APTS (3-aminopropyltriethoxysilane), a molecule having terminal amino groups such as 4-aminobutyltriethoxysilane, N-(2-aminoethyl)-3-aminopropyltrimethoxysilane, N-(2-aminoethyl)-3-aminopropylmethyldimethoxysilane or the like for example can be used for the self-assembled monolayer.

A substrate having both a region with positive zeta potential and a region with negative zeta potential at pH 5 can be used in place of the self-assembled monolayer patterned with amino groups and silanol groups. A combination of two surfaces of different types, such as a hydrophilic surface and a hydrophobic surface or a smooth surface and a bumpy surface, can be used in place of the self-assembled monolayer patterned with amino groups and silanol groups.

An aqueous solution containing $VOSO_4 \cdot H_2O$ can be used preferably in the present invention, but another vanadium-containing solution can be used in place of this aqueous solution containing $VOSO_4 \cdot H_2O$. NaOH can be used favorably for adjusting the pH, but another pH adjusting solution or the like can be used in place of NaOH. Patterning can also be accomplished without using NaOH.

An aqueous solution capable of depositing a vanadium-containing solid is used preferably in the present invention, but an organic solution or other nonaqueous solution system or a hydrothermic reaction system or the like can also be used as long as it is a reaction system capable of depositing a vanadium-containing solid.

The temperature of the reaction liquid can be adjusted appropriately at or above the congealing point and at or below the boiling point of the aqueous solution (about 0 to 99° C.) in conjunction with the raw material concentration, additives, pH and the like.

Glass can be used favorably for the substrate, but silicon substrates and metal, ceramic, polymer and various other kinds of substrates can also be used. In addition to flat-plate substrates, particulate substrates, fibrous substrates, complex substrates and the like can also be used appropriately.

In the present invention, liquid-phase patterning of an oxide vanadium crystal thin film is achieved by using a self-assembled monolayer. In this method, an APTS-SAM is first formed on a glass substrate, and then exposed to vacuum ultraviolet light through a photomask to thereby modify amino-terminated silanes into a silanol group surface in the exposed area. Next, the patterned SAM substrate is dipped in an aqueous solution of dissolved $VOSO_4 \cdot H_2O$ and NaOH.

The vanadium oxide particles produced in the aqueous solution have negative zeta potential in the initial aqueous solution at pH 5. These particles are affixed by means of static interaction to the amino-terminated silane surface, which has a positive zeta potential at pH 5. A thin film of vanadium oxide is formed on the amino-terminated silane surface as the affixed particles grow in the aqueous solution.

In the present invention, liquid phase patterning of a vanadium oxide thin film is achieved by area-selective adhesion of crystal particles and control of crystal growth. The formed thin film is a clear yellowish-green, and has the XRD pattern of $H_{7.24}V_6O_{13}$. The transmissibility of the thin film in the near-infrared range decreases about 10% (relative ratio 15%) when the temperature is raised from 25° C. (room temperature) to 70° C. This is the property of thermochromism seen in $VO_2$ and the like, and is an indicator of applicability to heat-shielding glass and thermosensors.

The fields of application of the present invention include thermosensors, cathodes of lithium ion battery, catalysts, switching device elements, antistatic coatings, counter-electrodes for electrochromic display devices, non-cooled infrared bolometers (non-cooled infrared detectors), holographic storage systems (data recording media using materials with high photosensitive efficiency), optical fiber switching devices, ultra-high-speed switching devices, photonic crystals and the like.

Effects such as the following are provided by the present invention.

(1) A vanadium oxide thin film pattern can be synthesized without an etching step.

(2) Degradation of property of the vanadium oxide due to etching damage can be prevented.

(3) Vanadium waste due to etching can be avoided.

(4) Also, films can be formed continuously by dipping new substrates because unreacted vanadium ions remain in the solution.

(5) Consequently, all of the vanadium raw material can be used in forming vanadium oxide.

(6) By using a deposition reaction from a liquid phase, vanadium oxide can be easily coated on particles, fibers and substrates with complex shapes.

BEST MODE FOR CARRYING OUT THE INVENTION

The present invention is explained in more detail below based on examples, but the present invention is not in any way limited by these examples.

Example 1

In this example, a vanadium oxide thin film pattern was prepared on a glass substrate using a self-assembled monolayer.

(1) Preparation of Self-Assembled Monolayer

In this example, preparation of a vanadium oxide thin film was attempted using a self-assembled monolayer. A glass substrate (Hioki #1737, Corning Co.) was washed by ultrasound washing for 5 minutes each with acetone, ethanol and ion-exchange water in that order.

This was then irradiated for 10 minutes with vacuum ultraviolet using a UV ozone cleaner (184.9 nm and 253.7 nm, low-pressure mercury lamp 200 W, PL21-200, SEN Lights Co.) to remove adsorbed organic matter from the surface of the glass substrate.

Next, the glass substrate surface was modified with an APTS-SAM (surface modification with APTS-SAM). The APTS (3-aminopropyltriethoxysilane, $H_2NC_3H_5Si(OCH_3)_3$) was dissolved to 1 vol % in anhydrous toluene, and the glass substrate was dipped for 2 hours in a nitrogen atmosphere in a glove box (VAC Co.) to prepare the APTS-SAM (FIG. 1).

(2) Patterning of Self-Assembled Monolayer

Figure 1:
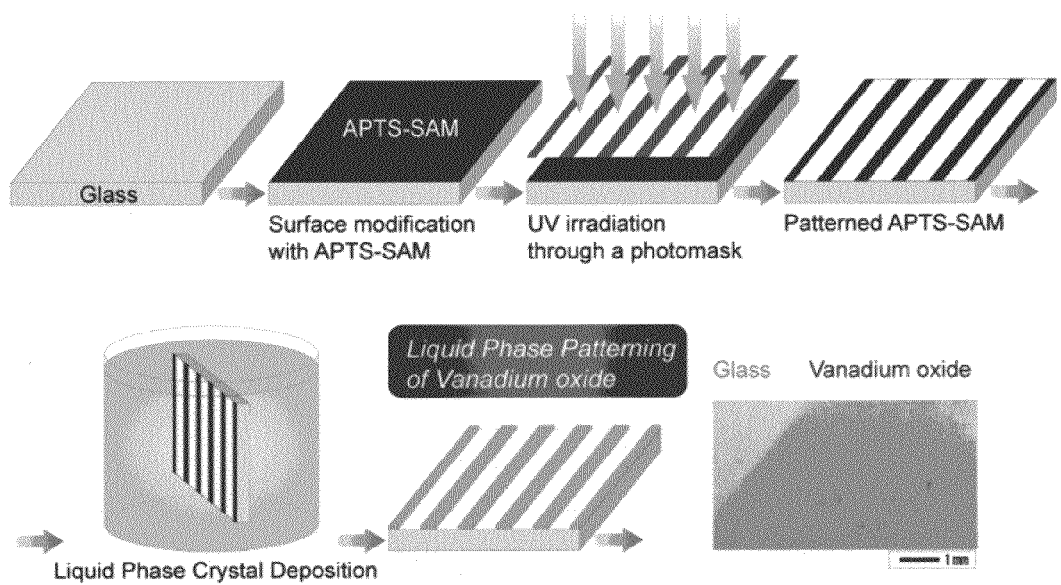
FIG. 1 shows a view of liquid-phase patterning of a vanadium oxide thin film using a self-assembled monolayer.

The APTS-SAM was irradiated (UV irradiation) with vacuum ultraviolet through a photomask (Test-chart-No. 1-N type, quartz substrate, 1.524 mm thickness, Toppan Printing Co., Ltd.) to modify the amino-terminal silanes of the exposed region into silanol groups (FIG. 1).

This patterned self-assembled monolayer having an amino-terminal silane surface and a silanol group surface (patterned APTS-SAM) was used as the template for patterning the vanadium oxide. The amino-terminal silane surface has a contact angle of about 48° with water, while the surface modified with silanol groups by exposure is hydrophilic, with a contact angle of 5° or less. This change in contact angle indicates that the APTS-SAM has been modified with hydrophilic silanol groups by means of the vacuum ultraviolet exposure.

(3) Deposition of Vanadium Oxide $VOSO_4 \cdot H_2O$ was dissolved in water at 25° C. to a concentration of 0.02 M. In an aqueous solution, vanadium is present as $VO^{2+}$ ions, also called vanadyl ions. The aqueous solution was heated to 70° C. using an oil bath, and NaOH was added to adjust the pH to 5.

The patterned self-assembled monolayer was dipped vertically in the top of the aqueous solution, and maintained at 70° C. for 6 hours to deposit vanadium oxide (liquid phase crystal deposition) as a test of liquid phase patterning of vanadium oxide (FIG. 1).

Example 2

(1) (Evaluation Methods)

In this example, the method in Example 1 described above is applied, and the zeta potentials of the particles produced in aqueous solution, the APTS self-assembled monolayer and the ATPS self-assembled monolayer after exposure to vacuum ultraviolet were measured with a laser zeta potentiometer (ELS-7300K, Otsuka Electronics Co., Ltd.).

The thin-film micropattern was observed with an optical microscope (BX51W1 Microscope, Olympus Optical Co., Ltd.) and an electron microscope (FE-SEM; JSM-6335F, JEOL Ltd.).

The crystal structure was evaluated with an X-ray diffraction meter (CuKα radiation XRD; RAD-1C, Rigaku). The transmissibility of the thin film at 25° C. and 70° C. was measured using a UV/VIS/NIR spectrophotometer (V-570, Jasco).

The samples in this case were fixed in an aluminum sample holder, and heated to 70° C. with an electrical heater fixed to the sample holder. The temperature of the thin film was measured with a thermocouple.

(2) Results

The microparticles produced in the aqueous solution in the aforementioned liquid phase patterning of vanadium oxide had negative zeta potential at pH 5. The APTS self-assembled monolayer exhibited positive zeta potential at pH 5 due to protonation of the amino groups ($-NH_2$ to $-NH_3^+$), while the silanol groups exhibited negative zeta potential due to de-protonation ($-Si-OH$ to $-Si-O^-$).

Area-selective adhesion of the initially formed microparticles to the amino group region was attempted by using static interaction between the particles (which had negative zeta potential) and the amino groups (which had positive zeta potential). A thin film was formed on a large region of the APTS self-assembled monolayer by 6 hours of dipping in advance of the micro-scale liquid phase patterning (FIG. 1). The area at the upper left shows the glass surface before thin film formation, which is colorless and transparent.

Figure 2:
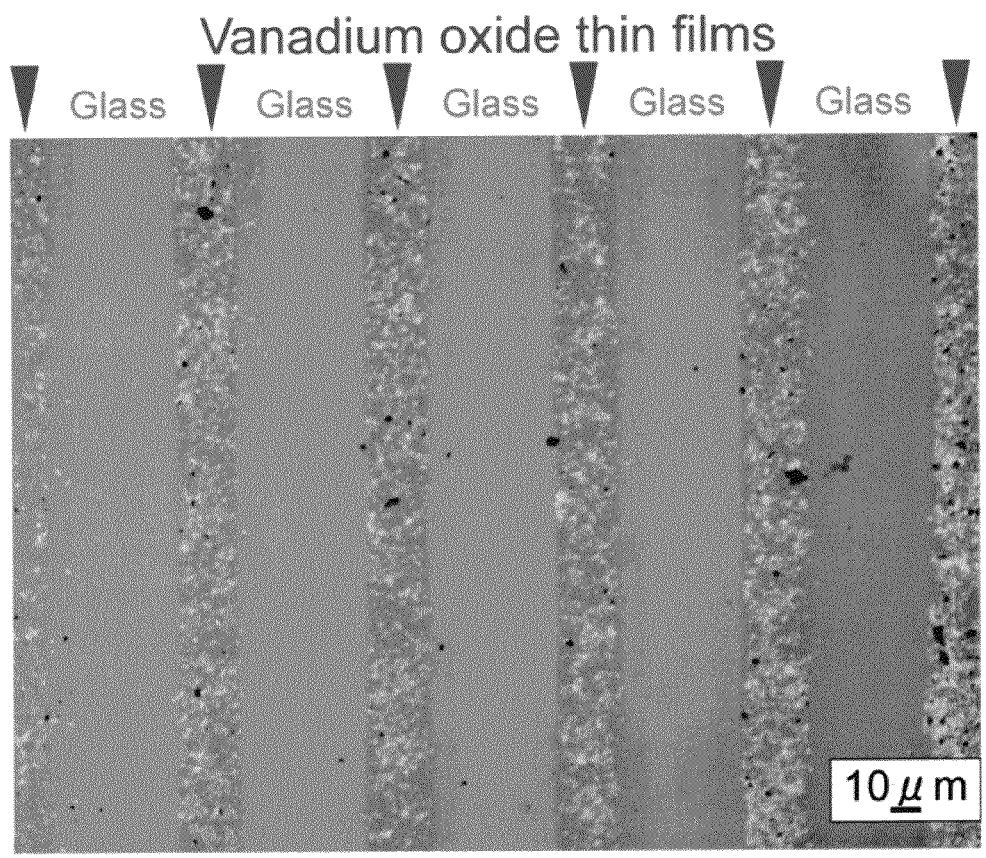
FIG. 2 shows an optical microscope image of a vanadium oxide thin film pattern.

The thin film region with the formed APTS self-assembled monolayer was a clear yellowish-green (FIG. 1). When the patterned APTS self-assembled monolayer was observed under an optical microscope after 6 hours of dipping, a thin film was formed area-selectively only on the amino-terminal silane region. FIG. 2 shows an optical microscope image of the vanadium oxide thin film pattern. Parallel lines about 40 μm in width were formed by this deposited thin film at intervals of 20 μm and with a length of 250 μm or more (FIG. 2).

Example 3

(1) Morphology of Thin Film Surface

In this example, the detailed morphology of the surface of the thin film prepared in Example 1 above was observed by scanning electron microscopy. Before platinum coating, the sample exhibited a strong white color in the silanol group region in contrast with the amino group region, and this is attributed to strong electrical charging of the glass surface of the silanol region from electron beam irradiation. This indicates the difference in surface state between the glass and the vanadium oxide.

Figure 3:
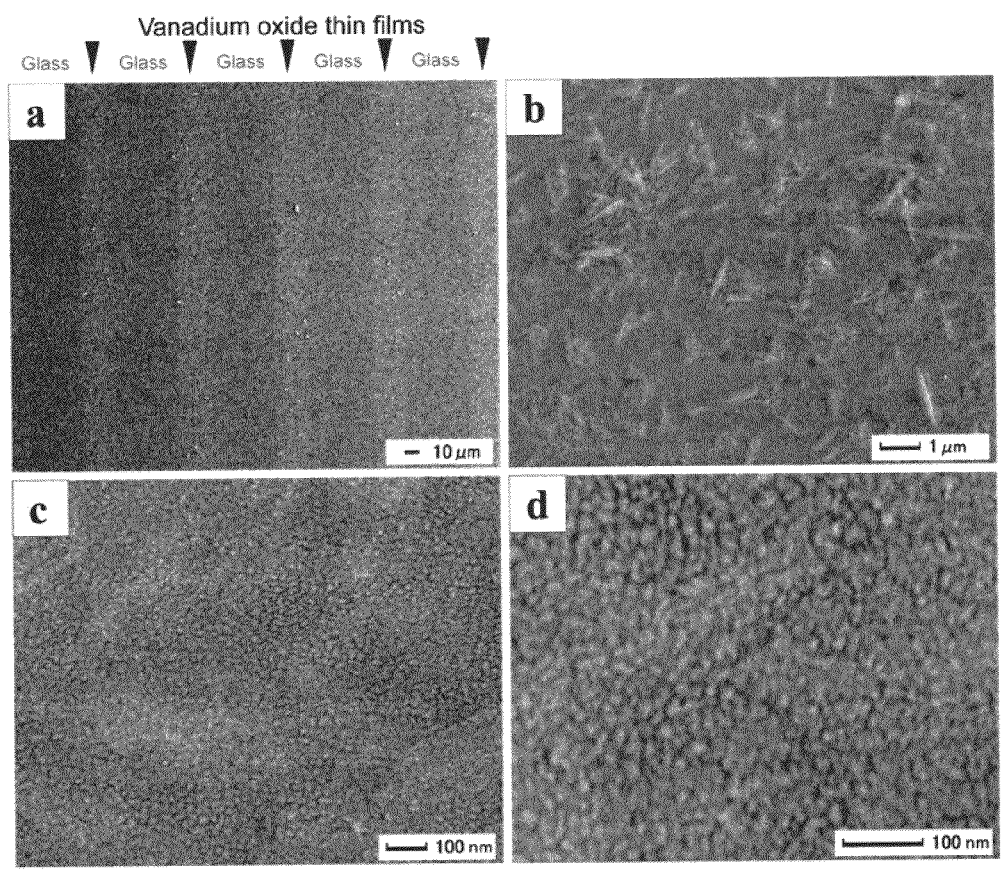
FIG. 3 shows an electron microscope image (3a) of a vanadium oxide thin film pattern, and shows enlarged images (3b to 3d) of the vanadium oxide thin film surface.

The patterned thin film was coated with 3 nm of platinum for an antistatic, and observed again. FIG. 3 shows an electron microscope image (3a) of the vanadium oxide images film pattern. (3b to 3d) of FIG. 3 show enlarged photographs of the vanadium oxide thin film surface. The amino group region appears somewhat whiter than the silanol group region, and this is attributed to thin film formation on the amino group region (FIG. 3a).

At high magnification, needle-shaped deposits 100 to 200 nm wide and about 1000 nm long were observed in the thin film (FIG. 3b). The thin film surface was covered with nano-sized protrusions with an inplane diameter of 2 to 10 nm (FIG. 3c).

(2) Crystal Structure

Figure 4:
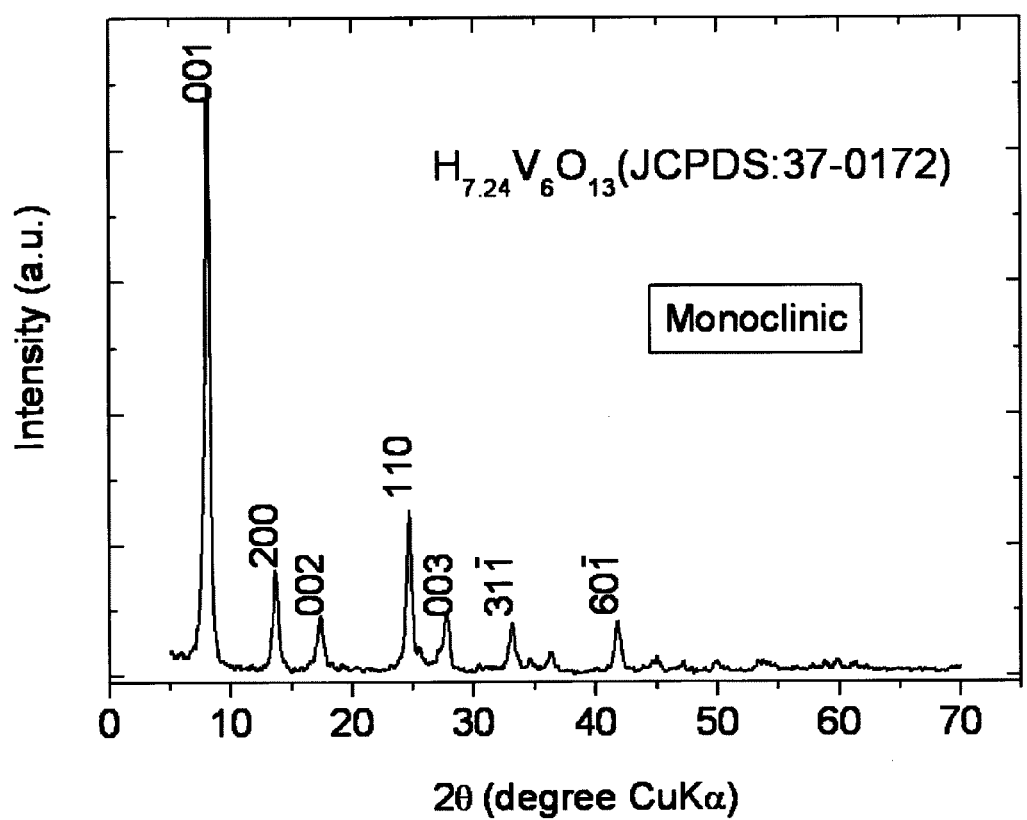
FIG. 4 shows the XRD pattern of a vanadium oxide thin film.

FIG. 4 shows the XRD pattern of the vanadium oxide thin film. A complex diffraction line is observed in XRD measurement of the thin film formed on the APTS self-assembled monolayer, and this is ascribed to the (001), (200), (002), (110), (003), (31-1) and (60-1) of $H_{7.24}V_6O_{13}$ (JCPDS No. 37-0172). Like $VO_2$, this $H_{7.24}V_6O_{13}$ has a monoclinic crystal structure.

(3) Thermochromism of Vanadium Oxide Thin Film

Figure 5:
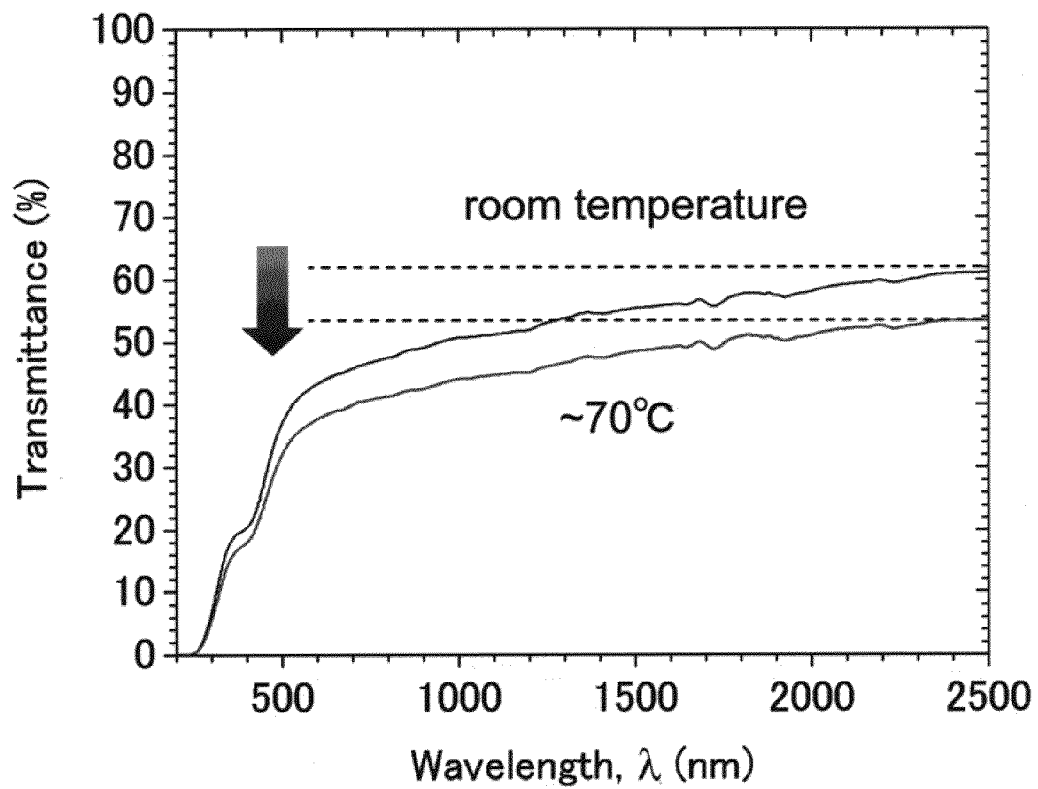
FIG. 5 shows the visible and infrared light transmission spectra of a vanadium oxide thin film at 25° C. and 70° C.

The visible and infrared transmission spectra of the vanadium oxide thin film were measured. FIG. 5 shows the visible and infrared transmission spectra of a vanadium oxide thin film at 25° C. and 70° C. The vanadium oxide thin film formed on the APTS self-assembled monolayer exhibited visible light transmissibility of about 20% at a wavelength of 400 nm and about 46% at a wavelength of 700 nm at 25° C.

This value decreases to about 18% at 400 nm and to about 40% at 700 nm when the temperature is raised to 70° C. At 25° C. the transmissibility in the infrared range is about 51% at a wavelength of 1000 nm and about 62% at a wavelength of 2500 nm, but this drops by about 10% in both cases (relative ratio 15%), to about 44% at 1000 nm and about 53% at 2500 nm, when the temperature is raised to 70° C.

The decrease in transmissibility when the temperature is raised to 70° C. is attributed to thermochromism. This change in transmissibility is believed to be due to a semiconductor-metal transition or in other words a change in crystal structure from monoclinic crystals to tetragonal crystals as seen in $VO_2$.

Figure 6:
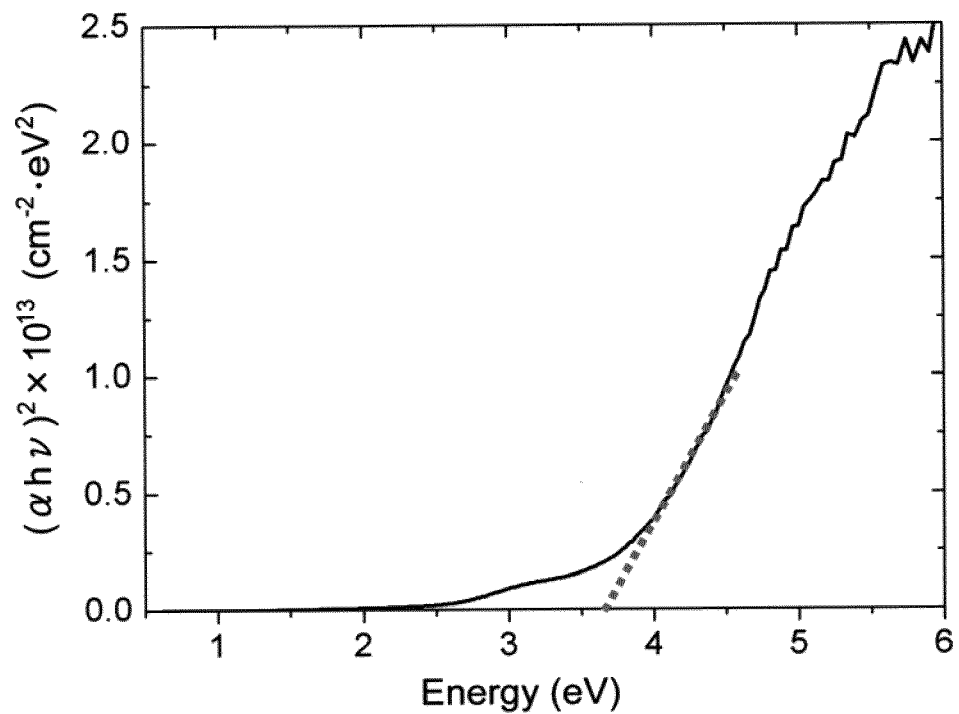
FIG. 6 shows the band gap evaluation results for a vanadium oxide thin film.

Transmissibility in the visible and infrared light ranges rose back to the original level when the temperature was lowered to 25° C., indicating that the thermochromism was reversible. FIG. 6 shows the results of an evaluation of the band gap of the vanadium oxide thin film. The band gap was about 3.7 eV as estimated based on the assumption that the formed thin film is a direct transition semiconductor like $VO_2$. This band gap suggests that the thin film is a transparent semiconductor. This finding is consistent with the evaluation results and with the thermochromism of the thin film.

Liquid phase patterning of a vanadium oxide thin film was achieved by using a self-assembling monolayer. In an aqueous solution vanadium oxide crystallized in the amino group region to form a thin film. This thin film was a clear yellowish-green, and covered with nano-sized bumps 2 to 10 nm in size on the surface. XRD revealed that the thin film was ascribable to $H_{7.24}V_6O_{13}$.

The transmissibility of the thin film in the infrared range fell about 10% when the temperature was raised from 25° C. to 70° C. This thermochromism is reversible, and suggests possible application to smart windows and thermosensors. The present invention illustrates the high potential of the self-assembly process and water-soluble process for next-generation device technology.

The invention claimed is:

1. A vanadium oxide thin film on a self-assembled monolayer (SAM), having an amino-terminal silane surface region and a silanol group surface region in a pattern on a substrate, wherein the vanadium oxide thin film exists selectively on the amino-terminated silane surface region, has an XRD pattern of $H_{7.24}V_6O_{13}$, and exhibits thermochromism.

2. The vanadium oxide thin film according to claim 1, wherein the substrate is a glass, silicon, metal, ceramic, or polymer substrate.

3. The vanadium oxide thin film according to claim 1, wherein the substrate is a flat plate substrate, a particulate substrate, or a fibrous substrate.

4. The vanadium oxide thin film according to claim 1, wherein the self-assembled monolayer is 3-aminopropyltriethoxysilane (APTS)—self-assembled monolayer (SAM) having a positive zeta potential at pH 5.

5. A method for fabricating the vanadium oxide thin film of claim 1, which comprises
   1) preparing the self-assembled monolayer having the amino-terminated silane surface region and the silanol group surface region in the pattern on the substrate, and
   2) dipping the substrate having the self-assembled monolayer in a solution reaction system capable of depositing a vanadium-containing solid, to thereby deposit vanadium oxide in a liquid phase.

6. The method for fabricating the vanadium oxide thin film according to claim 5, wherein the vanadium oxide is deposited in a liquid phase by adjusting the temperature, raw material concentration, additives, and/or pH of the reaction system.

7. The method for fabricating the vanadium oxide thin film according to claim 5, wherein a reaction system of an aqueous solution reaction, non-aqueous solution reaction, or hydrothermal reaction is used as the solution reaction system.

* * * * *